United States Patent [19]
Goto et al.

[11] Patent Number: 5,320,662
[45] Date of Patent: * Jun. 14, 1994

[54] PROCESS FOR CONTINUOUS COPPER SMELTING

[75] Inventors: Moto Goto; Nobuo Kikumoto; Osamu Iida, all of Tokyo, Japan

[73] Assignee: Mitsubishi Materials Corporation, Tokyo, Japan

[*] Notice: The portion of the term of this patent subsequent to May 4, 2010 has been disclaimed.

[21] Appl. No.: 56,780

[22] Filed: May 4, 1993

Related U.S. Application Data

[63] Continuation of Ser. No. 795,335, Nov. 20, 1991, Pat. No. 5,217,527.

[30] Foreign Application Priority Data

| Nov. 20, 1990 | [JP] | Japan | 2-314671 |
| Nov. 20, 1990 | [JP] | Japan | 2-314675 |
| Nov. 20, 1990 | [JP] | Japan | 2-314682 |

[51] Int. Cl.$^5$ ............................................. C22B 15/06
[52] U.S. Cl. ................................................... 75/645
[58] Field of Search ...................................... 75/645

[56] References Cited

U.S. PATENT DOCUMENTS

| 4,005,856 | 2/1977 | Themelis et al. |
| 4,144,055 | 3/1979 | Peterson ................ 75/645 |
| 4,178,174 | 12/1979 | Arentzen . |
| 4,238,228 | 12/1980 | Brimacombe et al. . |
| 4,504,309 | 3/1985 | Mackey et al. . |

FOREIGN PATENT DOCUMENTS 1190751 7/1985 Canada .

*Primary Examiner*—Peter D. Rosenberg
*Attorney, Agent, or Firm*—Oblon, Spivak, McClelland, Maier & Neustadt

[57] ABSTRACT

There is disclosed a process for continuous copper smelting. At first, a smelting furnace, a separating furnace, a converting furnace, melt launders for connecting the smelting furnace, the separating furnace and the converting furnace in series, a plurality of anode furnaces and blister copper launders for connecting the converting furnace and the anode furnaces are provided. Then, copper concentrate is introduced in the smelting furnace, and melted and oxidized into a mixture of matte and slag. The mixture is received in the separating furnace and the matte is separated from the slag. Subsequently, the matte separated from the slag is oxidized to produce blister copper. Subsequently, the blister copper is caused to flow through the blister copper launders into one of the anode furnaces, and refined into copper of higher quality in the anode furnace. In the refining operation at the anode furnace, the receiving step and the oxidizing step are carried out at least partly in an overlapping fashion.

4 Claims, 8 Drawing Sheets

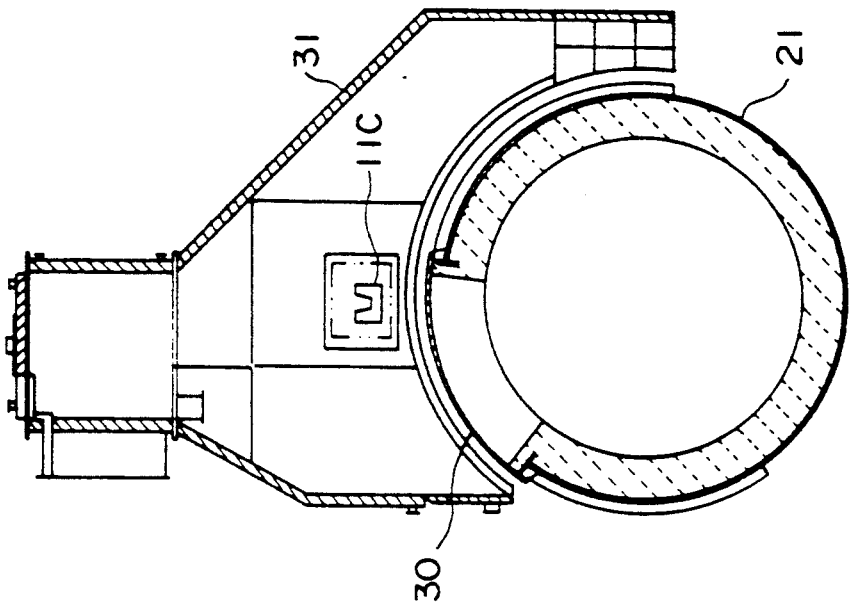
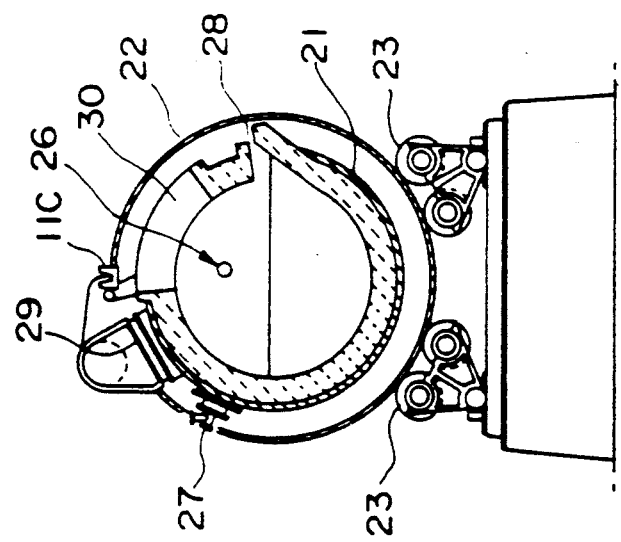

PROCESS FOR CONTINUOUS COPPER SMELTING

This is a continuation of application Ser. No. 07/795,335, filed on Nov. 20, 1991, now U.S. Pat. No. 5,217,527.

BACKGROUND OF THE INVENTION

1. Field of the Invention

The present invention relates to a process for smelting copper sulfide concentrates to extract copper.

2. Prior Art

As schematically depicted in FIGS. 1 and 2, a copper smelting apparatus comprised of a plurality of furnaces is hitherto known. The smelting apparatus comprises a smelting furnace 1 for melting and oxidizing the copper concentrates supplied together with oxygen-enriched air, to produce a mixture of matte M and slag S, a separating furnace 2 for separating the matte M from the slag S, a converter or converting furnace 3 for oxidizing the separated matte M into blister copper C and slag, and anode furnaces 4 and 4 for refining the blister copper C thus obtained to produce copper of higher purity. In each of the smelting furnace 1 and the converting furnace 3, a lance 5 composed of a double-pipe structure is inserted through the furnace roof and attached thereto for vertical movement. Copper concentrates, oxygen-enriched air, flux and so on are supplied into each furnace through the lance 5. The separating furnace 2 is an electric furnace, which is equipped with electrodes 6.

As shown in FIG. 1, the smelting furnace 1, the separating furnace 2 and the converting furnace 3 are arranged so as to have different elevations in the descending order, and are connected in series through launder 7A and 7B, so that the melt is tapped via gravitation through these launders 7A and 7B.

The blister copper C produced continuously in the converting furnace 3 is stored temporarily in a holding furnace 8, and then received in a ladle 9, which is conveyed by means of a crane 10 to the anode furnaces 4, and the blister copper C is poured thereinto through the inlet formed in the top wall.

In the smelting apparatus as described above, although the operations up to the converting furnace 3 are carried out continuously, the refining operations at the anode furnaces 4 are conducted in batches. Therefore, the blister copper C produced in the converting furnace 3 must be stored temporarily in the holding furnace 8. Accordingly, the installation of the holding furnace 8 is required. In addition, the ladle, the crane and so on are required in order to transport the blister copper C from the holding furnace 8 to the anode furnaces 4. Furthermore, a large amount of energy has been required to keep the temperature of the blister copper C high enough during these operations. As a result, the expenses for the installation of the facilities as well as the running costs are high, and the opportunities for the reduction in the installed area of the smelting apparatus are limited.

SUMMARY OF THE INVENTION

It is therefore a principal object and feature of the present invention to provide a novel continuous copper smelting process which does not require holding the blister copper melt temporarily prior to the refining at the anode furnace, and by which the whole operations up to the refining step at the anode furnaces can be continuously conducted in a very effective way.

Another object and feature of the invention is to provide a continuous copper smelting process which involves highly improved refining operation of the blister copper, and which does not require unduly large refining capacities.

A further object and feature of the invention is to provide a continuous copper smelting process in which upon refining blister copper at the anode furnace, the oxidation can be effectively carried out even when the amount of the blister copper is small.

According to a principal aspect of the invention, there is provided a process for continuous copper smelting, comprising the steps of:

providing a smelting furnace, a separating furnace, a converting furnace, melt launder means for connecting the smelting furnace, the separating furnace and the converting furnace in series, a plurality of anode furnaces and blister copper launder means for connecting the converting furnace and the anode furnaces;

introducing copper concentrate in the smelting furnace and melting and oxidizing the same to produce a mixture of matte and slag;

subsequently receiving the mixture of matte and slag in the separating furnace and separating the matte from the slag;

subsequently receiving the matte separated from the slag in the converting furnace and oxidizing the same to produce blister copper;

subsequently causing the blister copper to flow through the blister copper launder means into one of the anode furnaces; and refining the blister copper into copper of higher quality in the anode furnace.

According to another aspect of the invention, there is provided a continuous copper smelting process wherein the refining step includes:

receiving the blister copper tapped through the blister copper launder means in the anode furnace;

oxidizing the blister copper in the anode furnace by blowing oxidizing gas into the anode furnace;

subsequently reducing the oxidized copper in the anode furnace into the copper of higher quality; and subsequently discharging the copper of higher quality from the anode furnace; and wherein the blister copper receiving step and the oxidizing step are carried out at least partly in an overlapping fashion.

According to a further aspect of the invention, there is provided a continuous copper smelting process wherein the anode furnace includes a furnace body supported rotatably about an axis thereof with the axis being arranged horizontally, the furnace body including a tuyere opening thereinto, and wherein the oxidizing step includes blowing the oxidizing gas into the anode furnace while adjusting a depth of the tuyere from a melt surface in the anode furnace by rotating the furnace body. The oxidizing gas is preferably composed of oxygen-enriched air.

BRIEF DESCRIPTION OF THE DRAWINGS

FIG. 6 is a cross-sectional view of the anode furnace of FIG. 4 taken along the line VI—VI in FIG. 4;

FIG. 7 is a cross-sectional view of the anode furnace of FIG. 4 taken along the line VII—VII in FIG. 5;

DESCRIPTION OF PREFERRED EMBODIMENTS OF THE INVENTION

Figure 1:
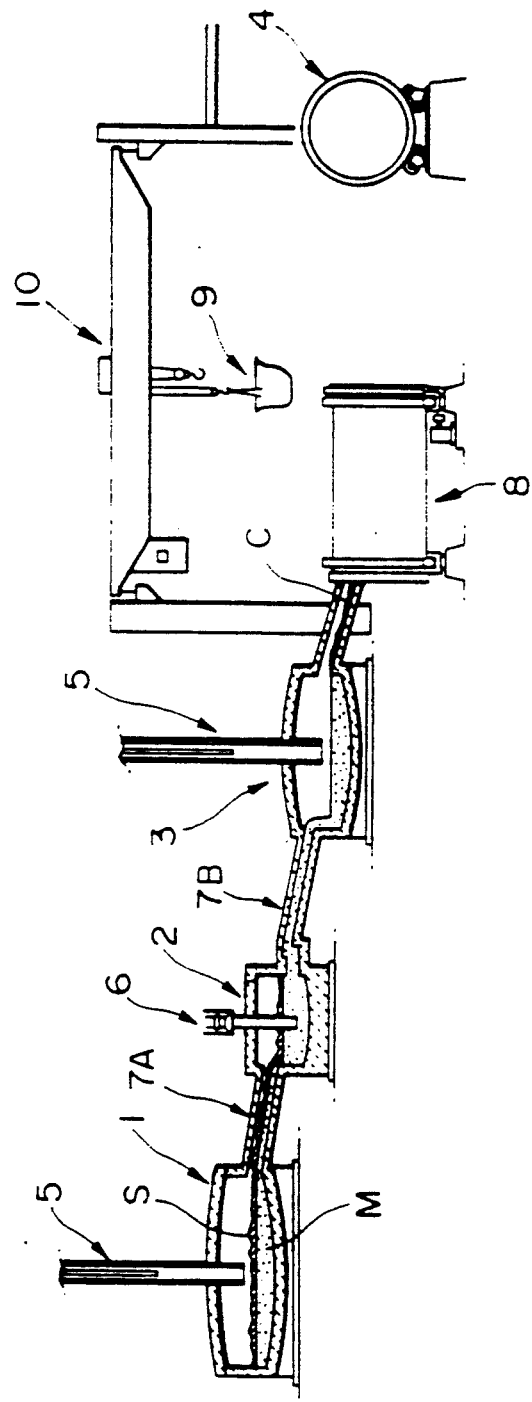
FIG. 1 is a schematic cross-sectional view of a conventional copper smelting apparatus.
Figure 2:
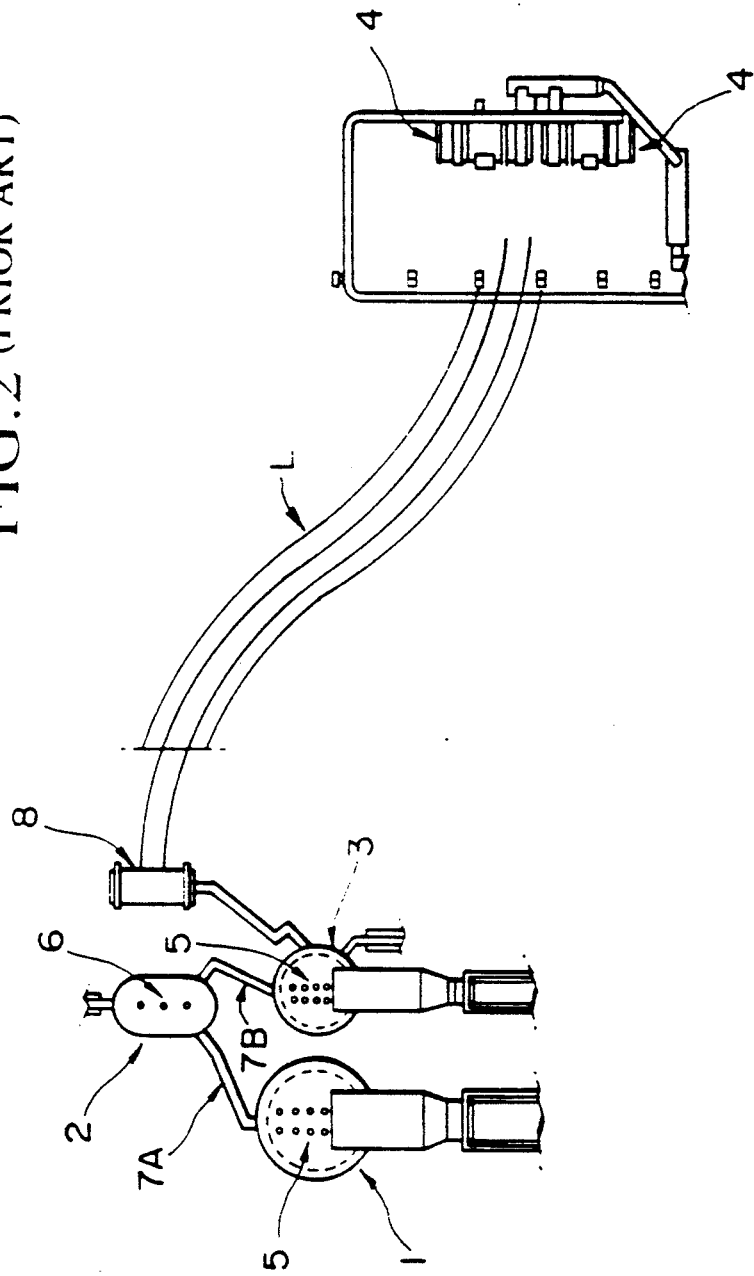
FIG. 2 is a schematic plan view of the apparatus of FIG. 1.
Figure 3:
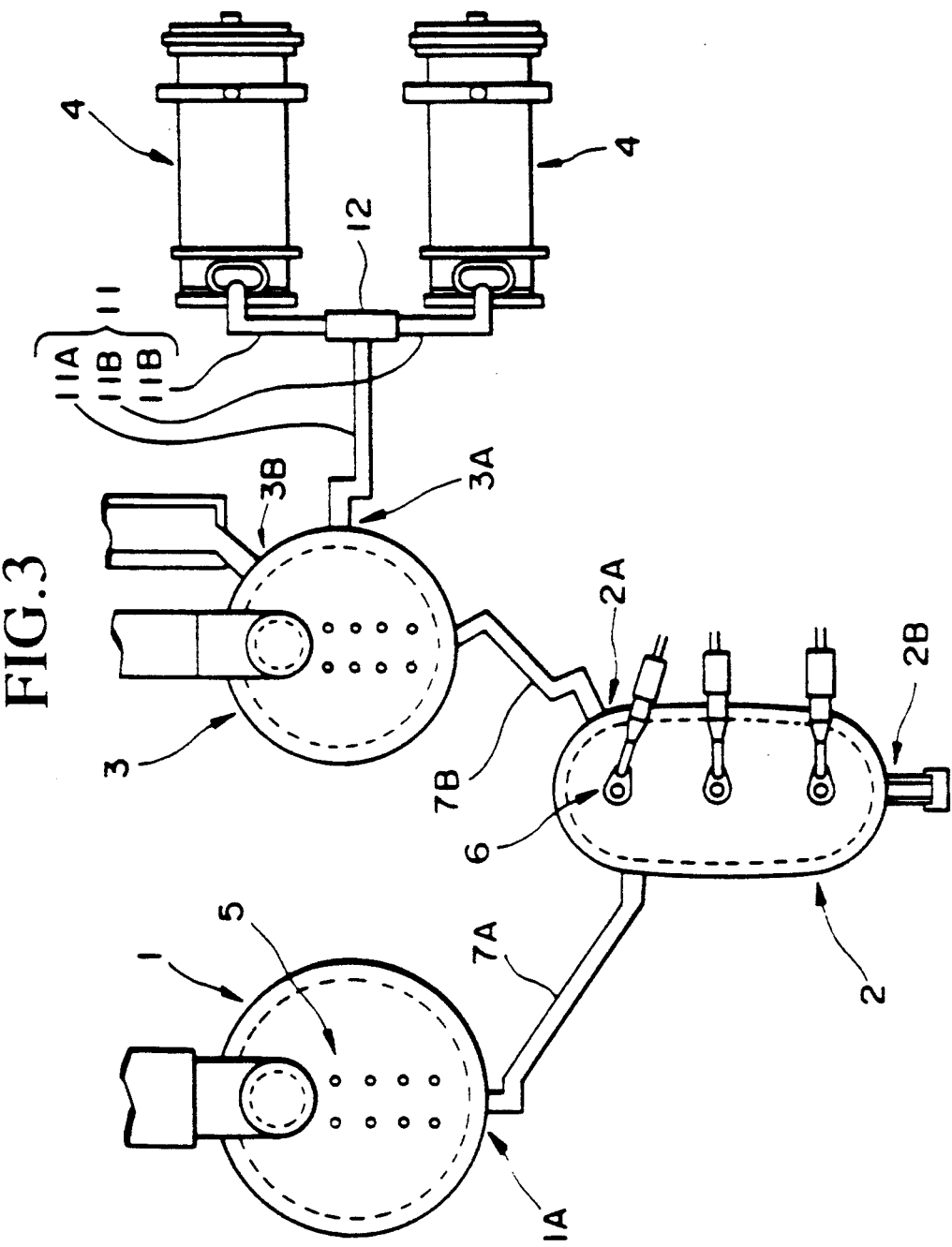
FIG. 3 is a plan view of an apparatus for practicing a continuous copper smelting process in accordance with the present invention.

FIG. 3 depicts a continuous copper smelting apparatus for practicing a copper smelting process in accordance with the invention, in which the same characters or numerals are used to denote the same parts or members as in FIGS. 1 and 2.

As is the case with the prior art smelting apparatus, the continuous copper smelting apparatus includes a smelting furnace 1 for melting and oxidizing copper concentrates to produce a mixture of matte M and slag S, a separating furnace 2 for separating the matte M from the slag S, a converting furnace 3 for oxidizing the matte M separated from the slag S to produce blister copper, and a plurality of anode furnaces 4 for refining the blister copper thus produced in the converting furnace 3 into copper of higher purity. The smelting furnace 1, the separating furnace 2 and the converting furnace 3 are arranged so as to have different elevations in the descending order, and melt launder means comprised of inclined launders 7A and 7B defining fluid passageways for the melt are provided so as to connect the above three furnaces in series. Thus, the melt is tapped from the smelting furnace 1 through the launder 7A to the separating furnace 2 and from the separating furnace 2 through the launder 7B down into the converting furnace 3. Furthermore, in each of the smelting furnace 1 and the converting furnace 3, a plurality of lances 5 each composed of a double-pipe structure are inserted through the furnace roof and secured thereto for vertical movement, and the copper concentrates, oxygen-enriched air, flux and so on are supplied into each furnace through these lances 5. Furthermore, the separating furnace 2 is composed of an electric furnace equipped with a plurality of electrodes 6.

In the illustrated embodiment, two anode furnaces 4 are arranged in parallel with each other, and the converting furnace 3 is connected to these anode furnaces 4 through launder means or assembly 11 defining fluid passageways for blister copper melt. The launder means 11, through which the blister copper produced in the converting furnace 3 is transferred to the anode furnaces 4, includes an upstream main launder 11A connected at its one end to the outlet of the converting furnace 3 and sloping downwardly in a direction away from the converting furnace 3, and a pair of downstream branch launders 11B and 11B branched off from the main launder 11A so as to be inclined downwardly in a direction away from the main launder 11A and connected at their ends to the anode furnaces 4 and 4, respectively.

Furthermore, means 12 for selectively bringing the main launder 11A into fluid communication with one of the branch launders 11B is provided at the junction between the main launder 11A and the branch launders 11B. This means 12 may be of any structure. In the simplest form, that portion of each branch launder 11B adjacent to the junction with the main launder 11A may be formed such that its bottom is somewhat shallow, and a castable or a lump of refractory material may be cast into the shallow portion of the branch launder 11B which is not to be utilized.

Furthermore, in addition to the other launders 7A and 7B, the above blister copper launders 11A and 11B are all provided with covers, heat conserving devices such as burners and/or facilities for regulating the ambient atmosphere are provided thereon, whereby the melt flowing down through these launders is kept at high temperature in a hermetically sealed state.

Figure 4:
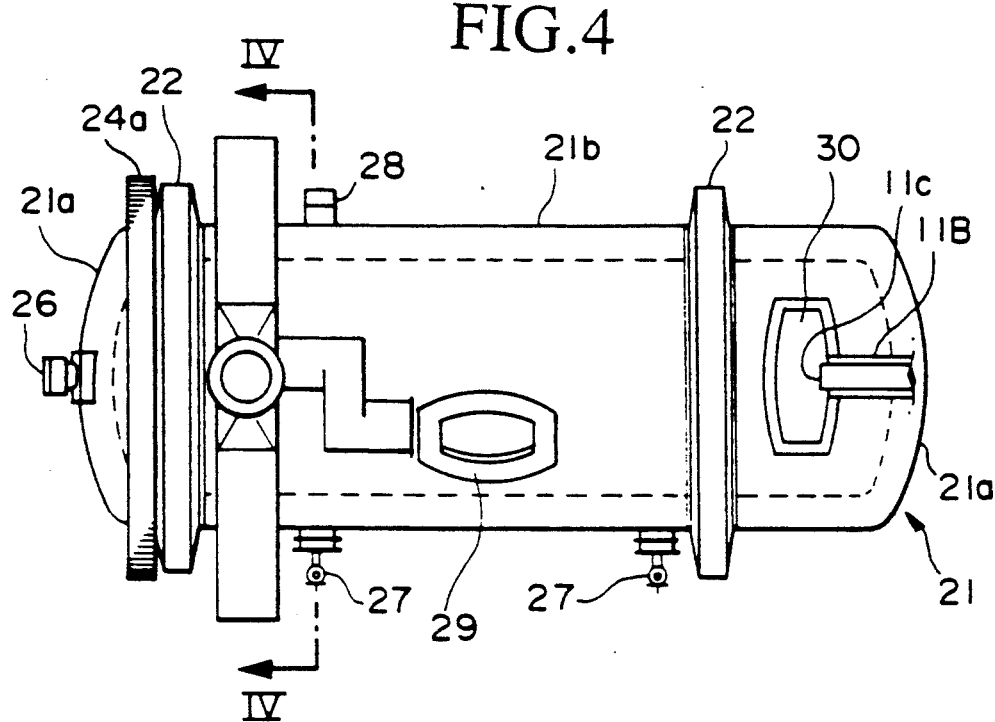
FIG. 4 is an enlarged plan view of an anode furnace used in the apparatus of FIG. 3.
Figure 5:
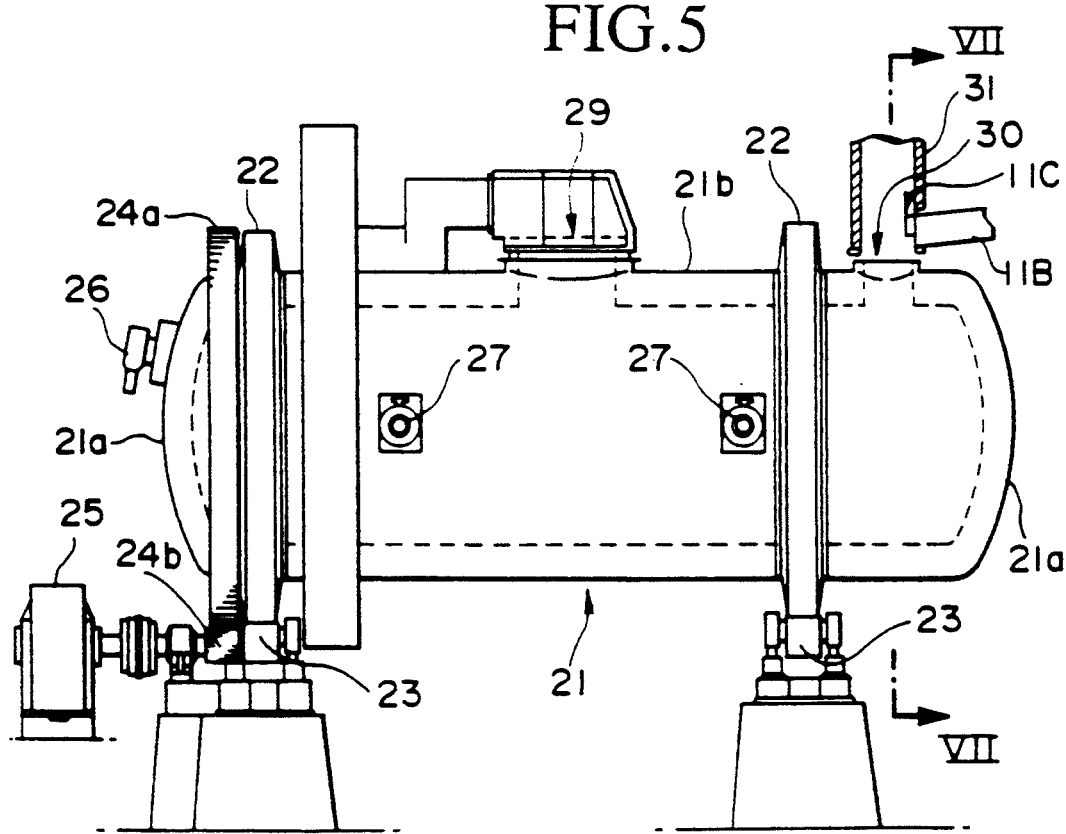
FIG. 5 is an enlarged side-elevational view of the anode furnace of FIG. 4.

As best shown in FIGS. 4 to 6, each anode furnace 4 includes a cylindrical furnace body 21 having a shell portion 21b and a pair of end plates 21a mounted on the opposite ends of the shell portion 21b, which is provided with a pair of tires 22 and 22 fixedly mounted thereon. A plurality of supporting wheels 23 are mounted on a base so as to receive the tires 22, so that the furnace body 21 is supported rotatably about its axis, which is disposed horizontal. A girth gear 24a is mounted on one end of the furnace body 21, and is meshed with a drive gear 24b, which is connected to a drive assembly 25 disposed adjacent to the furnace body 21, so that the furnace body 21 is adapted to be rotated by the drive assembly 25.

In addition, as shown in FIGS. 4 and 5, a burner 26 for keeping the melt in the furnace at high temperature is mounted on one of the end plates 21a, and a pair of tuyeres 27 and 27 are mounted on the shell portion 21b for blowing air or oxygen-enriched air into the furnace body 21. Furthermore, the shell portion 21b is provided with a tap hole 28 in opposite relation to one of the tuyeres 27, and the copper refined in the anode furnace is discharged through the tap hole 28 into a casting apparatus, where the copper is cast into anode plates. Furthermore, an inlet 29 for introducing lumps such as anode scraps into the furnace is mounted on the shell portion 21b at the upper mid-portion. Moreover, as shown in FIG. 6, a flue opening 30 of a generally elliptical shape is formed on top of the shell portion 21b opposite to the burner 26. The flue opening 30 extends circumferentially of the shell portion 21b from a position defining the top of the furnace when situated in the ordinary position.

A hood 31, which is provided at the end of an exhaust duct, is mounted so as to cover this flue opening 30. More specifically, as best shown in FIG. 7, the hood 31 extends so as to cover all the circumferential zone corresponding to the angular position of the flue opening 30 which moves angularly as the furnace body 21 rotates. Furthermore, each branch launder 11B for flowing the blister copper melt is inserted through the side plate of the hood 31 in such a manner that an end 11C of the launder 11B is located above the flue opening 30. The hood 31 as well as the end 11C of the launder 11B are provided with water-cooling jackets, respectively.

The copper smelting process in accordance with the present invention will be carried out using the aforesaid copper smelting apparatus.

First, granule materials such as copper concentrates are blown into the smelting furnace 1 through the lances 5 together with the oxygen-enriched air. The copper concentrates thus blown into the furnace 1 are partly oxidized and melted due to the heat generated by the oxidation, so that a mixture of matte M and slag S is formed, the matte containing copper sulfide and iron sulfide as principal constituents and having a high specific gravity, while the slag is composed of gangue mineral, flux, iron oxides and so on, and has a lower specific gravity. The mixture of the matte M and the slag S overflows from the outlet 1A of the smelting furnace 1 through the launder 7A into the separating furnace 2.

The mixture of the matte M and the slag S overflowed to the separating furnace 2 are separated into two immiscible layers of matte M and slag S due to the differences in the specific gravity. The matte M thus separated overflows through a siphon 2A provided at the outlet of the separating furnace 2, and is run off into the converting furnace 3 through the launder 7B. The slag S is tapped off from the tap hole 2B, and granulated by water and removed outside the smelting system.

The matte M tapped into the converting furnace 3 is further oxidized by oxygen-enriched air blown through the lances 5, and the slag S is removed therefrom. Thus, the matte M is converted into blister copper C, which has a purity of about 98.5%, and is tapped from the outlet 3A into the blister copper main launder 11A. Furthermore, the slag S separated in the converting furnace 3 has a relatively high copper content. Therefore, after discharged from the outlet 3B, the slag S is granulated by water, dried and recycled to the smelting furnace 1, where it is smelted again.

Figure 8:
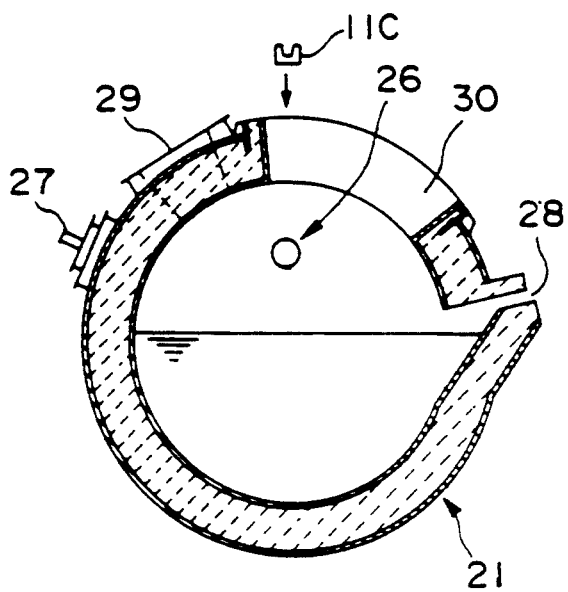
FIGS. 8 to 10 are cross-sectional views of the rotated anode furnace corresponding to blister copper receiving stage, oxidation stage, and reduction stage, respectively.

The blister copper C tapped into the main launder 11A flows through one of the branch launders 11B and 11B, which is in advance brought into fluid communication with the main launder 11A by casting a castable into the other branch launder, and is tapped through the flue opening 30 into a corresponding one of the anode furnaces 4. FIG. 8 depicts the rotated position of the anode furnace 4 which is maintained during the receiving operation.

Figure 9:
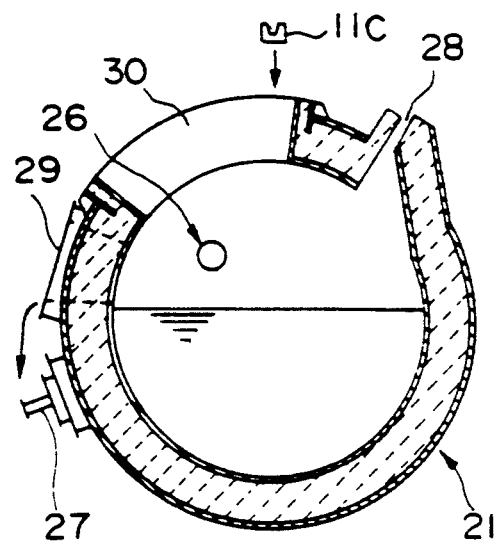

After the receiving operation of the blister copper C is completed, the drive assembly 25 is activated to rotate the furnace body 21 by a prescribed angle to the position as depicted in FIG. 9, where the tuyeres 27 are positioned under the surface of the melt. In this position, air, or preferably oxygen-enriched air, is first blown through the tuyeres 27 into the furnace body 21 to cause the oxidation of the blister copper C to occur for a prescribed period of time, thereby causing the sulfur concentration in the copper to approach a prescribed target value. Further, a reducing agent containing a mixture of hydrocarbon and air as principal constituents is supplied into the furnace body 21 to carry out the reduction operation, so that the oxygen content in the copper is caused to approach a prescribed target value. The exhausted gas produced during the above operations is recovered by leading the flue gas through the flue opening 30 and the hood 31 into the exhaust gas duct, and suitably treating it. The slag S is discharged from the inlet 29.

Figure 10:
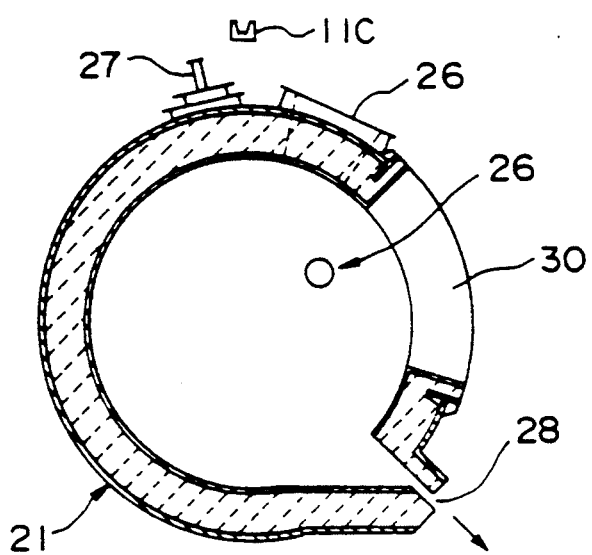

The blister copper C tapped from the converting furnace 4 is thus refined into copper of higher purity in the anode furnace 4. Then, the drive assembly 25 is activated again to further rotate the furnace body 21 by a prescribed angle as shown in FIG. 10, and the molten copper is discharged through the tap hole 28. The molten copper thus obtained is transferred using anode launder to an anode casting mold, and is cast into anode plates, which are then conveyed to the next electrorefining facilities.

Now, typical operational patterns for the refining step at the anode furnaces involving the reception of the blister copper C into the two anode furnaces 4 and 4, the oxidation, the reduction and the casting will be described with reference to the time schedules depicted in FIGS. 11 and 12.

Figure 11:
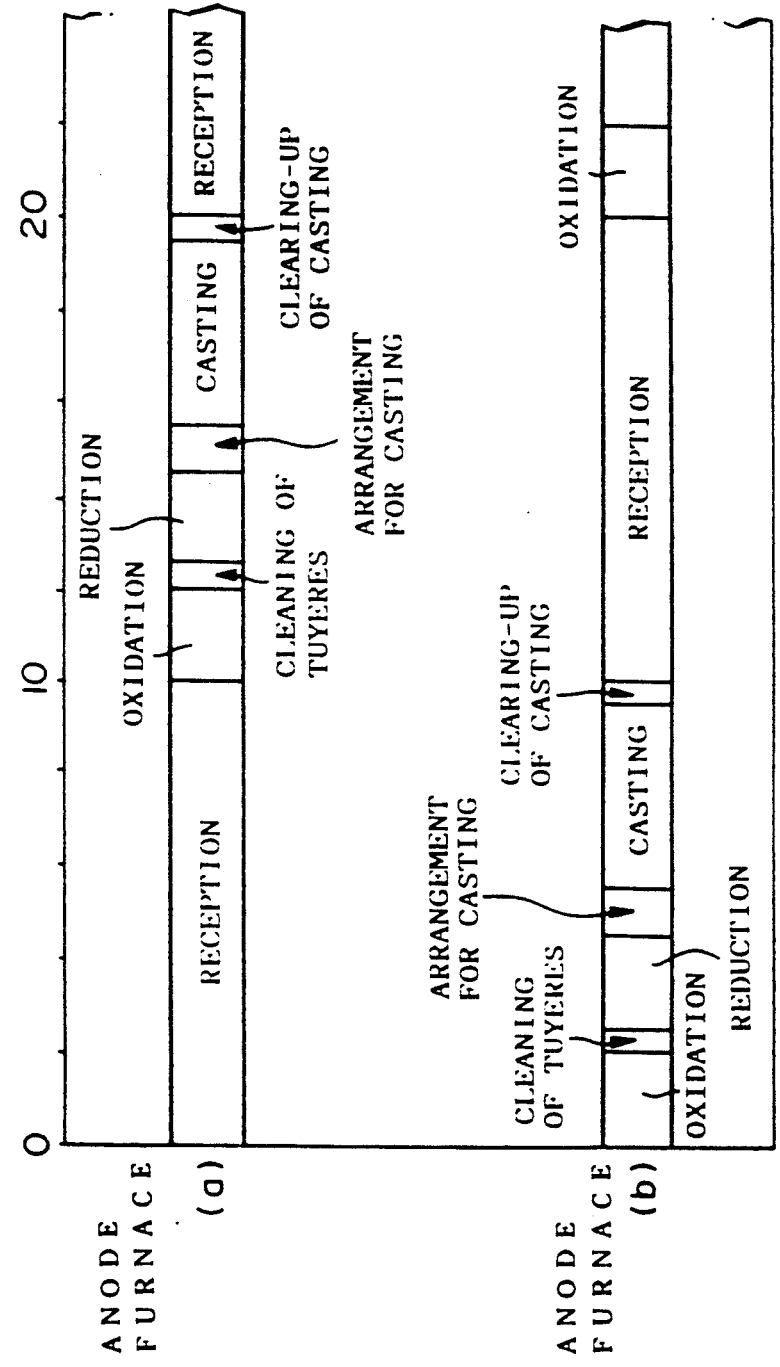
FIG. 11 is a schematic representation showing the operational flow in the refining step at the anode furnace of FIG. 4.

FIG. 11 corresponds to the case where the capacities of the anode furnace and the converting furnace are generally balanced. While the blister copper C is being received in one of the anode furnace (a), the blister copper C received in the previous step is subjected to oxidation, reduction, casting and miscellaneous operations accompanying these in the other anode furnace (b). In this pattern, it takes two hours for the oxidation, two hours for the reduction, and four hours for the casting operation. In addition, it takes half an hour to clean the tuyeres between the oxidation operation and the reduction operation, and one hour to arrange for the casting operation between the reduction operation and the casting operation, while it takes half an hour for clearing-up of casting between the casting operation and the commencement of the reception of the next charge. Thus, the total time required for the oxidation, the reduction, the casting operation, and other miscellaneous works such as cleaning of the tuyeres, arrangement for casting and cleaning-up for casting is ten hours, and is identical to the time required for receiving the charge in the anode furnace. Consequently, no waiting time is available between the cleaning-up for casting and the reception of the next charge.

Figure 12:
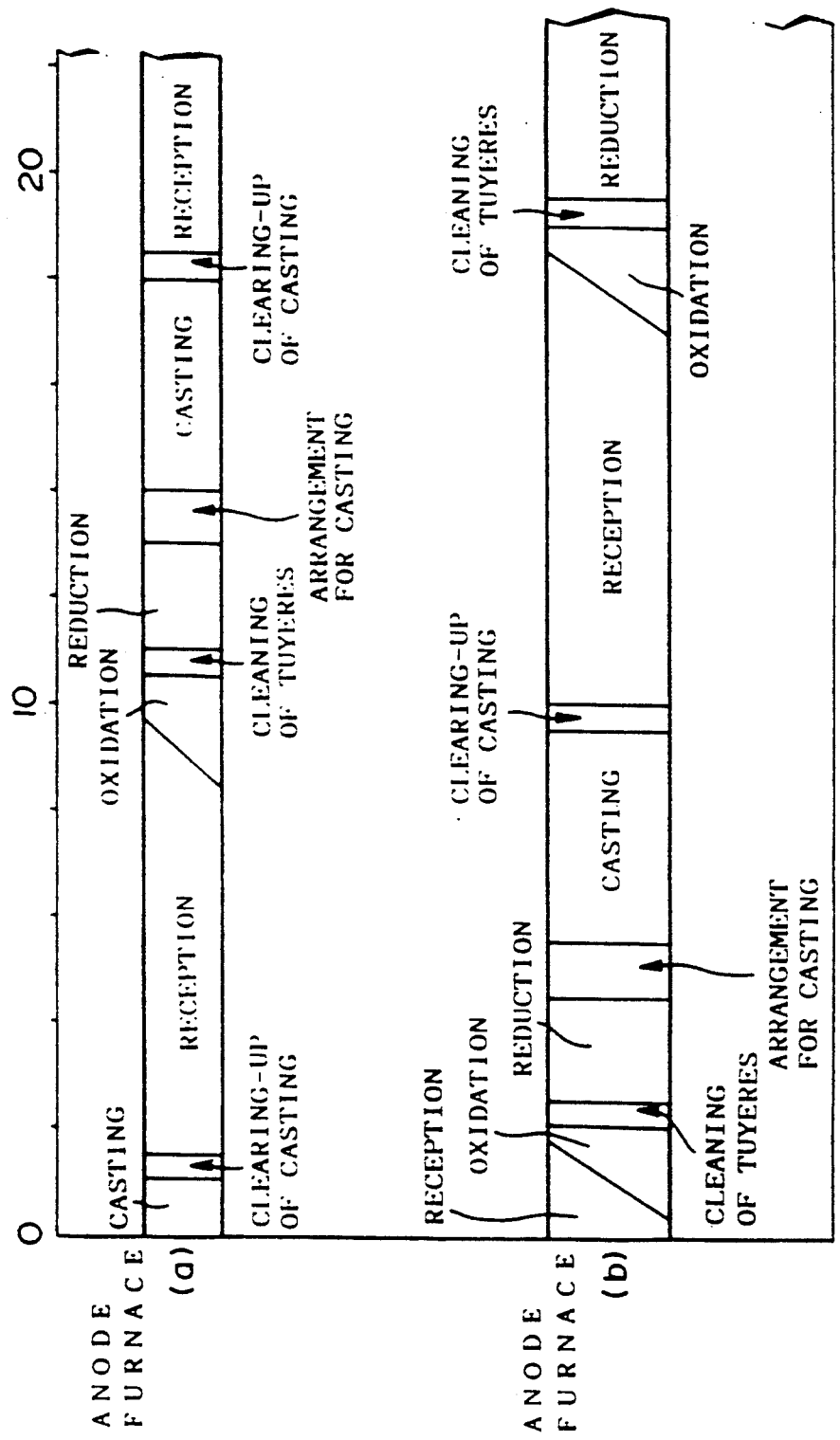
FIG. 12 is a view similar to FIG. 11, but showing the most preferable refining procedures.

FIG. 12 depicts a preferable pattern which may be adopted when the capacities of the anode furnaces are less than that of the converting furnace. In this case, in order to enhance the refining capacity, the oxidation of the blister copper C is carried out in parallel with the receiving of the blister copper at the last stage of the receiving operation. More specifically, the reception of the blister copper into the anode furnace is completed in 8.5 hours, while it takes 10 hours from the oxidation to the cleaning-up for the casting. Thus, the operating time required is saved by overlapping the receiving operation and the oxidation operation.

These receiving and oxidizing operations are carried out after the furnace body 21 is moved from the position of FIG. 8 to that of FIG. 9, and is continued even after the reception of the blister copper is completed.

With the above procedures, the reception and the oxidation are carried out in parallel with each other, so that the refining time for the blister copper is reduced by the overlapping time. Therefore, the capacity of the anode furnace is resultantly increased, and when the capacities in the previous steps are increased, the overall production rate is correspondingly enhanced.

In the foregoing, the time schedules shown in FIGS. 13 to 15 are just examples for the operations at the anode furnaces, and appropriate different patterns may be selected depending upon the number, capacities of the anode furnaces, and processing time for the respective operations. Furthermore, as to the overlapping time of the receiving and oxidation operations in FIG.

12, it should be properly determined in consideration of the production rate of the blister copper, oxidation capacity at the anode furnace and so on.

As described above, in the continuous copper smelting process in accordance with the invention, the transport of the blister copper C from the converting furnace 3 to one of the anode furnaces 4 is carried out directly through the launder means 11 defining fluid passageways for the blister copper melt. Therefore, no holding furnace is required, and naturally the heating operation at the holding furnace is not required, either. In addition, inasmuch as no transporting facilities such as ladles, crane and so on are required, the total installation area of the copper smelting apparatus can be substantially reduced. Furthermore, since the facilities such as holding furnace, ladles, crane and so on are not required, expenses for the installation of these facilities as well as the running costs can be lowered.

Furthermore, since the transport of the blister copper C from the converting furnace 3 to the anode furnaces 4 is carried out directly by the blister copper launder means 11, it is comparatively easy to maintain the blister copper C in a substantially hermetically sealed state during the transport. Accordingly, very little gases containing sulfur dioxide and metal fume are produced, and the leakage of these gases, which adversely affects the environment, can be prevented in advance. In addition, the temperature variations of the blister copper C can be minimized.

Furthermore, when the receiving operation and the oxidizing operation are carried out in parallel with each other during the refining step at the anode furnace, the refining capacity at the anode furnace is resultantly increased. Therefore, even though the capacity is predetermined, the anode furnace can flexibly cope with the variations in the capacities of the previous steps.

Moreover, in the oxidizing step at the anode furnace, the oxidizing gas is blown into the furnace while the depth of the tuyere from the melt surface is being adjusted by rotating the furnace body. Consequently, the oxidizing gas can react effectively with the copper melt, and hence the oxidation can be carried out in an effective way even in the early stage in which the amount of the copper melt is small.

Furthermore, when the oxygen-enriched air is used as the oxidizing gas, the heat balance and reactivity of oxidation can be controlled optimally, so that the productivity can be substantially increased.

Obviouly many modifications and variations of the present invention are possible in the light of the above teachings. It is therefore to be understood that within the scope of the appended claims, the invention may be practiced otherwise than as specifically described.

What is claimed is:

1. A copper smelting process comprising the steps of:
   providing a blister copper-producing means, a plurality of anode furnaces and blister copper launder means for connecting said blister copper-producing means and said anode furnaces;
   producing blister copper in said blister copper-producing means;
   subsequently causing said blister copper produced in said blister copper-producing means to flow from said blister copper-producing means directly through said blister copper launder means and into one of said anode furnaces; and
   refining said blister copper into copper of higher purity in said anode furnace.

2. The process as recited in claim 1, wherein said refining step includes the steps of:
   receiving the blister copper tapping through said blister copper launder means in said anode furnace;
   oxidizing the blister copper in said anode furnace by blowing oxidizing gas into said anode furnace;
   subsequently reducing the oxidized copper in said anode furnace into the copper of higher purity; and
   subsequently discharging said copper of higher purity from said anode furnace; and
   wherein said blister copper receiving step and said oxidizing step are carried out at least partly in an overlapping fashion.

3. The process as recited in claim 2, wherein said anode furnace includes a furnace body supported rotatably about an axis thereof with said axis being arranged horizontally, said furnace body including a tuyere opening thereinto, and wherein said oxidizing step includes blowing said oxidizing gas into said anode furnace while adjusting a depth of said tuyere from a melt surface in said anode furnace by rotating said furnace body.

4. The process as recited in claim 2, wherein said oxidizing gas is composed of oxygen-enriched air.

* * * * *

UNITED STATES PATENT AND TRADEMARK OFFICE
CERTIFICATE OF CORRECTION

PATENT NO. : 5,320,662
DATED : June 14, 1994
INVENTOR(S) : Moto GOTO, et al.

It is certified that error appears in the above-indentified patent and that said Letters Patent is hereby corrected as shown below:

On the title page, Item [*], the Terminal Disclaimer Date should read as follows:

--Jun. 8, 2010--

Signed and Sealed this

Sixth Day of September, 1994

Attest:

BRUCE LEHMAN

*Attesting Officer*         *Commissioner of Patents and Trademarks*

US005320662C1

(12) EX PARTE REEXAMINATION CERTIFICATE (5014th)
United States Patent
Goto et al.

(10) Number: US 5,320,662 C1
(45) Certificate Issued: *Nov. 9, 2004

(54) PROCESS FOR CONTINUOUS COPPER SMELTING

(75) Inventors: Moto Goto, Tokyo (JP); Nobuo Kikumoto, Tokyo (JP); Osamu Iida, Tokyo (JP)

(73) Assignee: Mitsubishi Materials Corporation, Tokyo (JP)

Reexamination Request:
No. 90/004,385, Sep. 26, 1996

Reexamination Certificate for:
Patent No.: 5,320,662
Issued: Jun. 14, 1994
Appl. No.: 08/056,780
Filed: May 4, 1993

( * ) Notice: This patent is subject to a terminal disclaimer.

Related U.S. Application Data

(63) Continuation of application No. 07/795,335, filed on Nov. 20, 1991, now Pat. No. 5,217,527.

(30) Foreign Application Priority Data

Nov. 20, 1990 (JP) .............................................. 2-314671
Nov. 20, 1990 (JP) .............................................. 2-314675
Nov. 20, 1990 (JP) .............................................. 2-314682

(51) Int. Cl.$^7$ .............................................. C22B 15/06
(52) U.S. Cl. ...................................................... 75/645
(58) Field of Search .......................................... 75/645

(56) References Cited

U.S. PATENT DOCUMENTS

| | | | | |
|---|---|---|---|---|
| 1,198,434 A | | 9/1916 | Garred ........................ 75/650 |
| 3,326,672 A | | 6/1967 | Worner ........................ 75/545 |
| 3,650,519 A | | 3/1972 | Vogt et al. .................. 266/218 |
| 3,715,203 A | | 2/1973 | DeBie .......................... 75/650 |
| 4,245,821 A | | 1/1981 | Kappell et al. .............. 266/163 |
| 4,390,169 A | * | 6/1983 | LaBate ........................ 266/196 |
| 4,421,552 A | | 12/1983 | Hoffmann et al. ............. 75/639 |
| 5,205,859 A | * | 4/1993 | Goto et al. .................... 75/640 |
| 5,320,799 A | * | 6/1994 | Goto et al. .................. 266/213 |
| 5,374,298 A | * | 12/1994 | Goto et al. .................... 75/645 |
| 5,380,353 A | * | 1/1995 | Goto et al. .................... 75/640 |
| 5,398,915 A | * | 3/1995 | Goto et al. .................. 266/213 |
| 5,449,395 A | | 9/1995 | George | |

FOREIGN PATENT DOCUMENTS

| | | | |
|---|---|---|---|
| GB | 16273 | of 1892 | .................. 75/645 |
| GB | 2 141 535 | 12/1984 | |
| JP | 4837646 | 11/1973 | |

(List continued on next page.)

OTHER PUBLICATIONS

TMS Technical Paper, Review of Flash Smelting and Flash Converting Technology, Paper No. A86–64, Dale W. Rodolff, Yrjo E. Anjala and Pekka T. Hanniala, The Metallurgical Society of AIME, 420 Commonwealth Drive, Warrendale, PA 15086, Mar. 1986.

(List continued on next page.)

*Primary Examiner*—Melvyn Andrews

(57) ABSTRACT

There is a disclosed a process for continuous copper smelting. At first, a smelting furnace, a separating furnace, a converting furnace, melt launders for connecting the smelting furnace, the separating furnace and the converting furnace in series, a plurality of anode furnaces and blister copper launders for connecting the converting furnace and the anode furnaces are provided. Then, copper concentrate is introduced in the smelting furnace, and melted and oxidized into a mixture of matte and slag. The mixture is received in the separating furnace and the matte is separated from the slag. Subsequently, the matte separated from the slag is oxidized to produce blister copper. Subsequently, the blister copper is caused to flow through the blister copper launders into one of the anode furnaces, and refined into copper of higher quality in the anode furnace. In the refining operation at the anode furnace, the receiving step and the oxidizing step are carried out at least partly in an overlapping fashion.

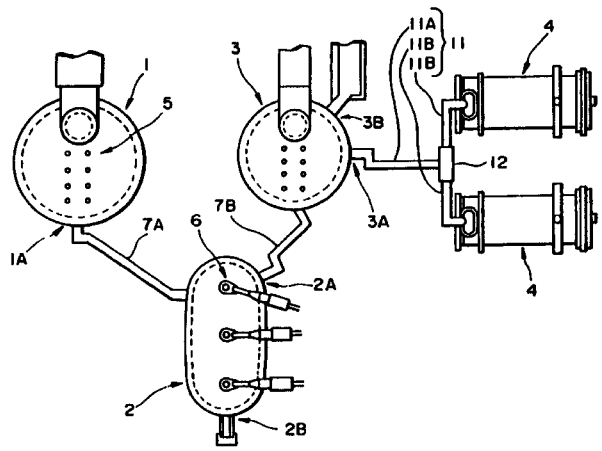

FOREIGN PATENT DOCUMENTS

| JP | 51-43447 | 11/1976 |
|----|----------|---------|
| JP | 55-5574 | 2/1980 |
| JP | 55-33597 | 3/1980 |
| JP | 57-210930 | 12/1982 |
| JP | 56-15649 | 1/1983 |
| JP | 59-110716 | 6/1984 |
| JP | 61-52327 | 8/1984 |
| JP | 63-247309 | 10/1988 |
| JP | 63-265802 | 11/1988 |
| JP | 1-294832 | 11/1989 |
| JP | 2-63544 | 3/1990 |

OTHER PUBLICATIONS

The Role of Oxygen in the Outokumpu Flash Smelting Process, Anjala, Y. Asteljoki and P. Hanniala, pp. 87–105. The Impact of Oxygen on the Productivity of Non–Ferrous Metallurgical Processes, Winnipeg, Canada, Aug. 23–26, 1987, vol. 2 Proceedings of the Metallurgical Society of the Canadian Institute of Mining and Metallurgy (Anjala et al I).

Outokumpu Flash Smelting in Copper Metallurgy—The Latest Developments and Applications, Yrjo Anjala, Jussi Asteljoki and Pekka Hanniala, pp. 19–35, *Copper* 87, vol. 4, Pyrometallurgy of Copper, 1998 (Anjala et al II).

Oxygen Smelting and the Olympic Dam Project, T.J.A. Smith, I. Posener and C.J. Williams, pp. 49–59, The Impact of Oxygen on the Productivity of Non–Ferrous Metallurgical Processes, Winnipeg, Canada, Aug. 23–26, 1987, vol. 2 Proceedings of the Metallurgical Society of the Canadian Institute of Mining and Metallurgy, Smith et al.

Pyrometallurgy of Copper, L.M. Gazarian, 2nd revised and supplemental edition, Metallurgia, Moscow 1965, pp. 204–208.

Preparation of Anodes: Sulphur and Oxygen Removal, Chapter 12, pp. 242–245Extractive Metallurgy of Copper, A.K. Biswas, University of Queensland, Brisbane, Australia and W. G. Davenport, McGill University of Quebec, Canada, 1976.

* cited by examiner

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1 to 4 are cancelled.

* * * * *